(12) United States Patent
Boulanov (10) Patent No.: US 8,463,914 B2
(45) Date of Patent: Jun. 11, 2013

(54) FACILITATING RAPID ESTABLISHMENT OF HUMAN/MACHINE VOICE COMMUNICATION LINKS OVER AN IP NETWORK USING LAST-KNOWN CALL-HOST ENDPOINT STATES

(75) Inventor: Oleg Boulanov, Beverly, MA (US)

(73) Assignee: Eliza Corporation, Danvers, MA (US)

( * ) Notice: Subject to any disclaimer, the term of this patent is extended or adjusted under 35 U.S.C. 154(b) by 478 days.

(21) Appl. No.: 12/697,213

(22) Filed: Jan. 30, 2010

(65) Prior Publication Data

US 2011/0191479 A1 Aug. 4, 2011

(51) Int. Cl.
*G06F 15/16* (2006.01)

(52) U.S. Cl.
USPC ............ 709/227; 709/203; 709/226; 370/396

(58) Field of Classification Search
USPC ............................ 709/227, 203, 226; 370/396
See application file for complete search history.

(56) References Cited

U.S. PATENT DOCUMENTS

| | | | |
|---|---|---|---|
| 6,577,968 B2 | 6/2003 | Nelson | |
| 7,457,756 B1 | 11/2008 | Nelson et al. | |
| 7,492,814 B1 | 2/2009 | Nelson | |
| 7,522,594 B2 | 4/2009 | Piche et al. | |
| 7,522,608 B2* | 4/2009 | Samdadiya et al. | 370/395.21 |
| 7,624,195 B1* | 11/2009 | Biswas et al. | 709/245 |
| 7,768,998 B1* | 8/2010 | Everson et al. | 370/352 |
| 2002/0112073 A1* | 8/2002 | MeLampy et al. | 709/240 |
| 2004/0019636 A1* | 1/2004 | St. Pierre et al. | 709/203 |
| 2006/0007940 A1* | 1/2006 | Sollee et al. | 370/396 |
| 2006/0029076 A1* | 2/2006 | Namihira et al. | 370/392 |
| 2007/0071027 A1* | 3/2007 | Ogawa | 370/465 |
| 2008/0101335 A1* | 5/2008 | Badger | 370/352 |
| 2009/0006841 A1* | 1/2009 | Ormazabal et al. | 713/152 |
| 2009/0106428 A1* | 4/2009 | Dahlen | 709/227 |
| 2009/0125628 A1* | 5/2009 | Dahlen | 709/227 |
| 2011/0153827 A1* | 6/2011 | Yengalasetti et al. | 709/226 |

OTHER PUBLICATIONS

Kenneth N. Stevens, Acoustic Phonetics, book, 1998, pp. 258-259, Massachusetts Institute of Technology, United States.
Francois Auger and Patrick Flandrin, Improving the Readability of Time-Frequency and Time-Scale Representations by the Reassignment Method, publication, 1995, pp. 1068-1089, vol. 43, IEEE.

(Continued)

*Primary Examiner* — Ario Etienne
*Assistant Examiner* — Michael C Lai
(74) *Attorney, Agent, or Firm* — Russ Weinzimmer; Russ Weinzimmer & Associates PC (57) ABSTRACT

A method and system are provided that enhance human/machine communication so as to more closely approximate natural human/human communication by more effectively establishing communications links for human-interactive media. Specifically, the speed and quality of the connection are improved by the method and system, resulting in a more natural user experience. The method includes a communication system receiving a call request from a requestor. The communication system has a Connection Proxy (CP) and a plurality of Endpoints (EPs). The CP has an endpoint state table (EST) configured to store state information associated with each of the plurality of endpoints (EPs). Based on the call request, the CP selects an EP using the EST. If the selected EP accepts the requested communications link, the CP establishes a communications link that excludes the CP itself. The CP also updates the EST based on a response to the call request from the selected EP.

33 Claims, 3 Drawing Sheets

OTHER PUBLICATIONS

T. J. Gardner and M. O. Magnasco, Instantaneous Frequency Decomposition: An Application to Spectrally Sparse Sounds with Fast Frequency Modulations, publication, 2005, pp. 2896-2903, vol. 117; No. 5, Acoustical Society of America, United States.

Randy S. Roberts, William A.. Brown, and Herscel H. Loomis, Jr., Computationally Efficient Algorithms for Cyclic Spectral Analysis, magazine, 1991, pp. 38-49, IEEE, United States.

David T. Blackstock, Fundamentals of Physical Acoustics, book, 2000, pp. 42-44, John Wiley & Sons, Inc., United States and Canada.

Iwao Sekita, Takio Kurita, and Nobuyuki Otsu, Complex Autoregressive Model and Its Properties, publication, 1991, pp. 1-6, Electrotechnical Laboratory, Japan.

Saeed V. Vaseghi, Advanced Digital Signal Processing and Noise Reduction, book, 2006, pp. 213-214, 3rd edition, John Wiley & Sons, Ltd, England.

Malcolm Slaney, An Efficient Implementation of the Patterson-Holdsworth Auditory Filter Bank, technical report, 1993, pp. 2-41, Apple Computer Technical Report #35, Apple Computer, Inc., United States.

* cited by examiner

FACILITATING RAPID ESTABLISHMENT OF HUMAN/MACHINE VOICE COMMUNICATION LINKS OVER AN IP NETWORK USING LAST-KNOWN CALL-HOST ENDPOINT STATES

TECHNICAL FIELD

The present invention relates generally to the field of network telephony, and more particularly to systems for establishing and maintaining human/machine communications links.

BACKGROUND

Modern communication systems facilitate human-to-human communication at a distance. Compared with other information-bearing signals, direct human/human interaction, such as face-to-face speech, is relatively lag-free, noise-free, even, and stable. Accordingly, typical communications systems that support human/human speech are configured to minimize, or at least reduce, signal distortions such as lag, noise, unevenness, and instability.

One popular approach to communication-at-a-distance is network telephony. Generally, network telephony systems exchange digital signals that represent speech. In some network telephony systems, the digital signals are the result of processing captured analog speech signals. In other network telephony systems, one or more of the digital signals are created by a machine as an original signal.

Network telephony has grown in popularity, in part because of the advent of a standard protocol, the "Session Initiation Protocol (SIP)." Generally, some SIP systems follow certain protocols to establish and maintain communications links for human-interactive media. In some cases, the human-interactive media is provided by software systems that create synthesized speech for delivery to the human user. In other cases, the human-interactive media is speech generated by another human, digitized and transmitted on the network. Thus, SIP systems support both human/human and human/machine communication.

These systems, however, suffer from numerous drawbacks with regards to intelligibility and naturalness. For example, humans are generally adept at filtering out signal distortion in ordinary face-to-face human/human communication, in part because visual information such as body language provides additional context. Human/human communication is also delay-free, allowing for a natural pace of conversation.

In human/machine communications, however, signal distortions can cause significant problems in both signal processing and content extraction. For example, unstable connections, suffering from high drop-out, can greatly degrade human/machine communication. Delays in the human/machine communication can also greatly degrade the quality of the interaction. Keeping the initial setup period short is key to a natural user experience, requiring efficient connection setup of a link between the human interface device and the machine hosting the target application for human/machine communication.

In typical prior art systems, the machine-side system sets up a communications link for human-interactive media by "polling by options." In the polling by options approach, a central machine sends options (e.g., available, busy, etc.) to the machines that host the target applications. These machine states are probed by the central machine at regular intervals, which increases network traffic and introduces lag time on the network. Further, periodic polling does not always result in up-to-date machine state information. And, generally, up-to-date machine state information is needed to quickly and effectively select appropriate resources to respond to a request. Without up-to-date machine state information, the call setup process for a human/machine communications link can be so untimely as to cause unsatisfactory connection times and/or increased signal distortion, leading to impaired communications.

SUMMARY

In a general aspect of the invention, a method is provided for establishing a communications link for human-interactive media. The method includes receiving a call request from a requestor. The communication system has a Connection Proxy (CP) and a plurality of Endpoints (EPs). The CP establishes a communications link between an EP and a call provider. The CP has an endpoint state table (EST) configured to store state information associated with each of the plurality of endpoints (EPs). Each EP provides one or more application services to a requestor over a communications link. The method includes selecting a selected EP from the plurality of EPs using the EST based on the call request. The method includes transmitting a first link request to the selected EP. The method includes receiving a first response from the selected EP, the first response indicating whether the EP is configured to establish the requested communications link. The method includes modifying the EST to incorporate the first response. The method includes, in the event the first response indicates that the selected EP is configured to accept the requested communications link, establishing the requested communications link between the selected EP and the call provider, the requested communications link not including the CP.

In a preferred embodiment, in the event the first response indicates that the selected EP is not configured to establish the requested communications link, the method includes selecting an alternate EP from the plurality of EPs using the EST. The method includes transmitting a second link request to the alternate EP. The method includes receiving a second response from the alternate EP, indicating whether the EP is configured to establish the requested communications link. The method includes modifying the EST to incorporate the second response. The method includes, in the event the second response indicates that the alternate EP is configured to establish the requested communications link, establishing the requested communications link between the alternate EP and the call provider.

In another preferred embodiment, each EP is configured to retain a current application configuration for a period of time after termination of a communications link. In another preferred embodiment, the first response includes state information associated with the selected EP. In another preferred embodiment, the call request identifies a selected application service from a plurality of application services provided by one or more of the plurality of EPs.

In yet another preferred embodiment, the state information includes a last known application configuration for each EP. In another preferred embodiment, the state information includes a last known application configuration for each EP, and the selection of a selected EP is based on the last known application configuration for the selected EP. In another preferred embodiment, the CP selects from a subset of EPs whose state information in the EST meets pre-determined criteria, and the pre-determined criteria includes a time since the last received response from the EP.

In still another preferred embodiment, the CP is one of a plurality of CPs. In another preferred embodiment, the CP is one of a plurality of CPs, and each of the plurality CPs have an identical configuration. In another preferred embodiment, the CP is a Session Initiation Protocol (SIP) proxy. In another preferred embodiment, the plurality of EPs is a Session Initiation Protocol (SIP) enabled call host. In another preferred embodiment, the plurality of EPs sends state information to the CP at a pre-determined interval.

In another preferred embodiment, the method includes, in the event the first response indicates that the selected EP is configuring itself to accept the requested communications link, but is not yet ready to accept the requested communications link, waiting for a second response from the selected EP. The method includes, in the event the second response indicates that the selected EP is configured to accept the requested communications link, establishing the requested communications link between the selected EP and the call provider, the requested communications link not including the CP.

In yet another preferred embodiment, the selected EP includes a first task server, a first symbolic server, and a first acoustic server, the first task server being configured to provide application services. In another preferred embodiment, the requestor is a call provider external to the communication system. In another preferred embodiment, the requestor is a Job Initiation Service (JIS) internal to the communication system.

In another general aspect of the invention, a system is provided for establishing a communications link for human-interactive media. The system includes an interface configured to couple to an internal system and an external system, the external system including at least one call provider. The interface is configured to receive a call request from a requestor, the call request proposing to establish a requested communications link between the call provider and a call host. The system includes an internal system coupled to the interface, the internal system including at least one Connection Proxy (CP) and a plurality of Endpoints (EPs) acting as call hosts. The at least one CP having an Endpoint State Table (EST), the EST being configured to store state information associated with each of a plurality of EPs. The at least one CP is configured to receive the call request from the interface, to select a selected EP from the plurality of EPs using the EST, and to transmit a first link request to the selected EP. Each EP is configured to provide one or more application services, to receive a first link request from the at least one CP, and to transmit a response indicating whether the EP is configured to establish the requested communications link. The at least one CP is further configured to modify the EST to incorporate the response and, in the event the response indicates that the selected EP is configured to establish the requested communications link, to establish the requested communications link between the selected EP and the call provider, the established communications link not including the at least one CP.

In a preferred embodiment, the at least one CP is further configured to select an alternate EP from the plurality of EPs using the EST, in the event the response indicates that the selected EP is not configured to establish the requested communications link. The CP is further configured to transmit a second link request to the alternate EP and to receive a second response from the alternate EP, the second response indicating whether the EP is configured to establish the requested communications link. The CP is further configured to modify the EST to incorporate the second response; and establish the requested communications link between the alternate EP and the call provider, in the event the second response indicates that the alternate EP is configured to establish the requested communications link.

In yet another preferred embodiment, each EP is further configured to retain a current application configuration for a period of time after termination of a communications link. In another preferred embodiment, the response includes state information associated with the selected EP. In another preferred embodiment, the request identifies a selected application service from a plurality of application services provided by one or more of the plurality of EPs.

In still another preferred embodiment, the state information includes a last known application configuration for each EP. In another preferred embodiment, the state information includes a last known application configuration for each EP, and the selecting a selected EP is based on the last known application configuration for the selected EP. In another preferred embodiment, the at least one CP is further configured to select a selected EP from a subset of EPs whose state information in the EST meets pre-determined criteria, and the pre-determined criteria includes a time since the last received response from the EP.

In yet another preferred embodiment, each of the at least one CPs has an identical configuration. In another preferred embodiment, the at least one CP is a Session Initiation Protocol (SIP) proxy. In another preferred embodiment, each of the plurality of EPs is a Session Initiation Protocol (SIP) enabled call host. In another preferred embodiment, each of the plurality of EPs is further configured to send state information to the at least one CP at a pre-determined interval.

In another preferred embodiment, the at least one CP is further configured to in the event the first response indicates that the selected EP is configuring itself to accept the requested communications link, but is not yet ready to accept the requested communications link, wait for a second response from the selected EP. The at least one CP is further configured to, in the event the second response indicates that the selected EP is configured to accept the requested communications link, establish the requested communications link between the selected EP and the call provider, the requested communications link not including the at least one CP.

In still another preferred embodiment, the selected EP includes a first task server, a first symbolic server, and a first acoustic server, the first task server being configured to provide application services. In another preferred embodiment, the requestor is a call provider external to the communication system. In another preferred embodiment, the requestor is a Job Initiation Service (JIS) internal to the communication system.

BRIEF DESCRIPTION OF THE DRAWING

The invention will be more fully understood from the following detailed description, in conjunction with the following figures, wherein.

DETAILED DESCRIPTION

Figure 1:
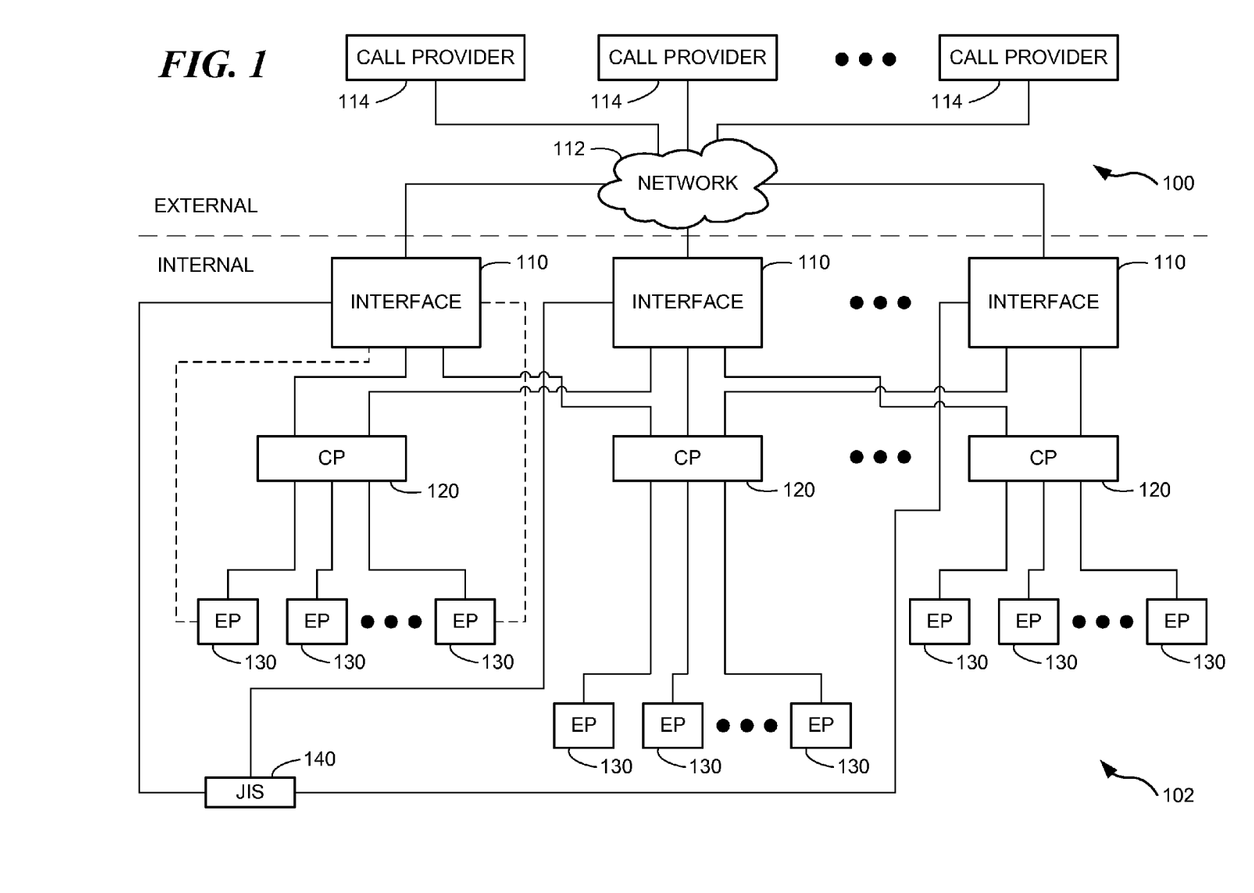
FIG. 1 is a block diagram showing an embodiment of the invention for communicating human-interactive media via the Internet to and from a plurality of call providers.

FIG. 1 is a high-level block diagram illustrating an embodiment of the invention connected to a network 112 so as to provide communication between the invention and a plurality of call providers 114. External network 100 includes network 112 and a plurality of call providers coupled to network 112. Network 112 can be the Internet, a wide-area network, a public switched telephone network, or any other suitable network configured to support internet protocol (IP) based switching. Call providers 114 are each otherwise conventional call providers, configured to provide voice-over-IP (VoIP) services to an end user (not shown).

System 102 includes a plurality of network interfaces 110, each coupled to network 112. Generally, each network interface 110 is an otherwise conventional network interface, configured to route IP packets between network 112 and various components of system 102, as described in more detail below. Specifically, each interface 110 couples to one or more Connection Proxies (CP) 120, one or more EndPoints (EP) 130, and at least one Job Initiation Service (JIS) 140.

Generally, each CP 120 establishes end-to-end communication links between a call provider 114 and a particular EP 130, as described in more detail below. In the illustrated embodiment, each CP 120 operates independently. In one embodiment, each CP 120 is configured to be added to or removed from system 102 without causing performance disruptions that significantly affect the system. As described in more detail below with reference to FIG. 2, in one embodiment, each CP 120 maintains an independent pool of EP state information (EST) 220 for a group of EPs 130.

In one embodiment, CP 120 uses the EP state information to select an EP 130 in the communication link setup process, described in more detail below. During operation of system 102, CP 120 continually updates the EP state information according to the most recent response by the EP 130 to any request, which decreases the length of time required to select an appropriate EP 130 for a requested communication link. In the illustrated embodiment, once CP 120 successfully selects an EP 130, and a connection between the selected EP 130 and call provider 114 is established, the CP 120 does not participate in the subsequent communication between the EP 130 and call provider 114 for that session.

Generally, each EP 130 is an otherwise conventional, SIP-enabled, computer-based, or server-based, host, and is configured to provide application service resources. In one embodiment, an application service resource is any suitable resource configured to deliver or support human-interactive media. In one embodiment, each EP 130 is state-full and dedicated/attached for interaction with a human. In one embodiment, each EP 130 is configured to decide whether to accept or reject a SIP call service request from a CP 120 and to respond to the CP 120 accordingly. The EP 130 transmits a positive final response when the EP 130 is ready to immediately provide the application service resource. In the illustrated embodiment, each EP 130 operates independently, and individual EPs can be added or removed or otherwise altered without substantial performance degradation of the operation of the other system components.

In the illustrated embodiment, each CP 120 couples to a particular subset of all of the EPs 130 in system 102. In one embodiment, each CP 120 couples to every EP 130 in system 102. In one embodiment, each CP 120 couples to a predetermined subset of all of the EPs 130 in system 102. In one embodiment, each CP 120 couples to a dynamically assigned subset of all of the EPs 130 in system 102. In one embodiment, each CP 120 couples to an exclusive subset of all of the EPs 130 in system 102. In an alternate embodiment, each CP 120 couples to a subset of all of the EPs 130 in system 102, and that subset includes one or more EPs 130 also coupled to another CP 120.

Similarly, in the illustrated embodiment, each interface 110 couples to a particular subset of CPs 120 of all the CPs 120 in system 102. In one embodiment, each interface 110 couples to every CP 120 in system 102. In one embodiment, each interface 110 couples to a predetermined subset of all of the CPs 120 in system 102. In one embodiment, each interface 110 couples to a dynamically assigned subset of all of the CPs 120 in system 102. In one embodiment, each interface 110 couples to an exclusive subset of all of the CPs 120 in system 102. In an alternate embodiment, each interface 110 couples to a subset of all of the CPs 120 in system 102, and that subset includes one or more CPs 120 also coupled to another interface 110.

Very generally, system 102 receives a call request, requesting establishment of a communications link between system 102 and a target call provider 114. The request includes certain link characteristics, such as support for a particular application service resource. CP 120 selects an EP 130 to service the request, and if EP 130 accepts the request, establishes a communications link between the selected EP 130 and the target call provider 114. Having established the communications link, EP 130 and call provider 114 communicate "directly", that is, without including CP 120 in the communication path.

Generally, an in-bound request (provider-to-endpoint) is initiated by a call provider 114 sending a request to a CP 120 (through network 112 and interface 110). Similarly, an out-bound request (endpoint-to-provider) is initiated by Job Initiation Service (JIS) 140 sending a request to a CP 120 (through interface 110, or directly). In one embodiment, an out-bound request includes a 'refer-to' address designating a target call provider 114. Generally, the components of system 102 operate as described in more detail with respect to FIG. 2.

Figure 2:
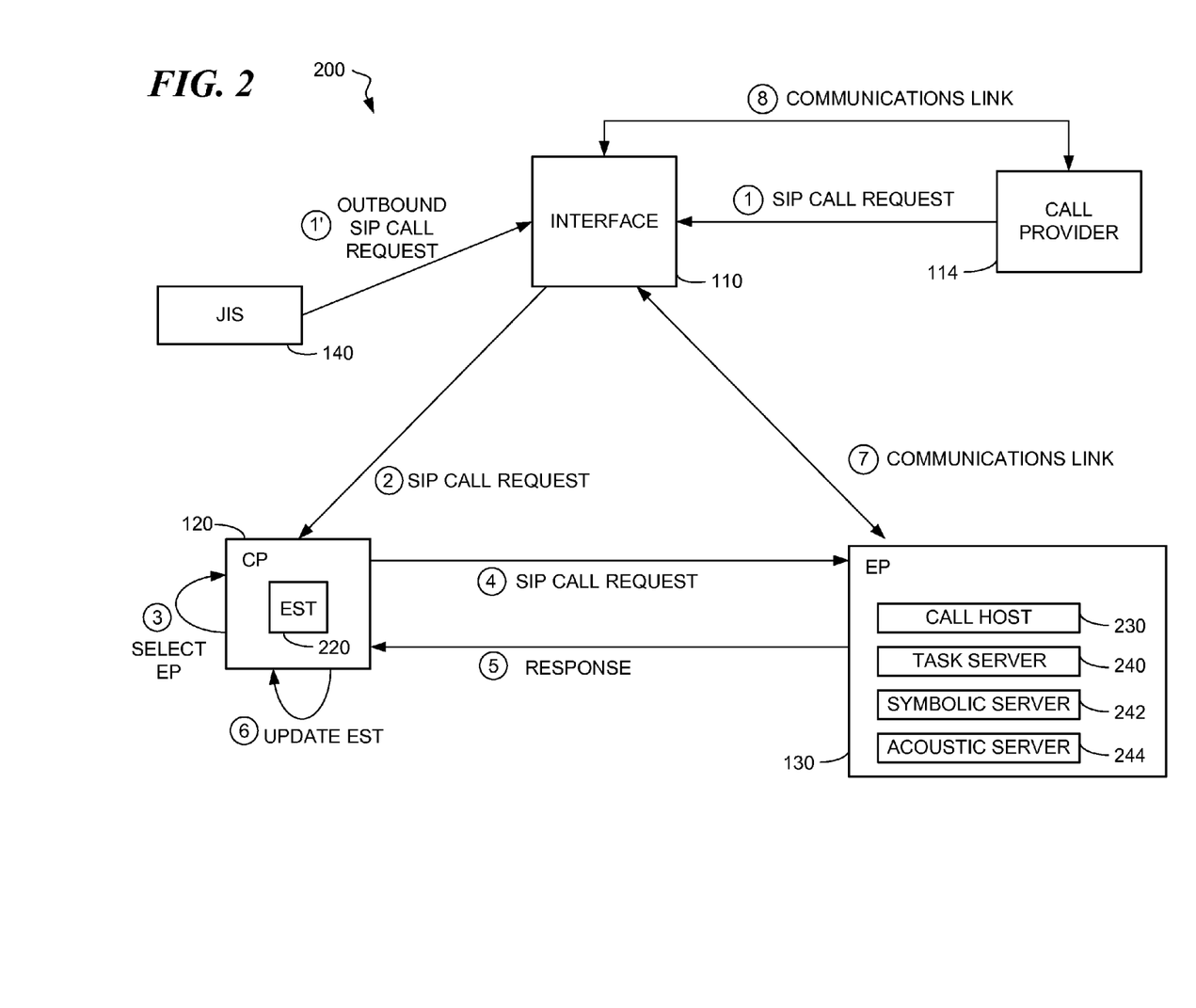
FIG. 2 is a protocol diagram showing a protocol for establishing a communications link for human-interactive media.

FIG. 2 is a protocol diagram illustrating a protocol 200 for establishing a communications link for human-interactive media in accordance with one embodiment. Specifically, FIG. 2 illustrated the interaction of interface 110, call provider 114, CP 120, EP 130, and JIS 140 as a communications link is established between EP 130 and call provider 114.

As indicated at (1), call provider 114 initiates an SIP call request, sending a call request to interface 110. Alternately, as indicated at (1'), JIS 140 initiates an SIP call request, sending a call request to interface 110. In both cases, the call request identifies a target call provider 114 and a type of application service resource requested. As indicated at (2), interface 110 passes the call request to a CP 120.

In the illustrated embodiment, CP 120 includes an EndPoint State Table (EST) 220. Generally, EST 220 is a collection of state information regarding a subset of EPs 130. In one embodiment, state information includes the status of an EP 130, including the last-known readiness (e.g., available, busy, etc.), the last-known-application service configuration, the connectivity status (e.g., offline, online), and/or any other suitable information regarding the operational status of an EP 130. In one embodiment, EST 220 includes state information for each EP 130 of the system 102. In an alternate embodiment, EST 220 includes state information for a subset of EPs 130 of the system 102.

In one embodiment, on startup of system 102, EST 220 is cleared. In an alternate embodiment, CP 120 receives currently available, previously configured Endpoint state information and updates EST 220 to include the received Endpoint state information. In an alternate embodiment, CP 120 receives a pre-configured EST 220.

As indicated at (3), CP 120 selects an EP 130 to service the call request. In one embodiment, CP 120 selects the EP 130 by referring to EST 220. In one embodiment, CP 120 searches EST 220 for an EP 130 that best matches the call request, according to the state information known at the time of the request. In one embodiment, CP 120 specifies parameters indicating the type of service being requested in the call request and consults EST 220 to select an appropriate EP 130 for the request based on the request parameters and the Endpoint state information. As indicated at (4), in one embodiment, CP 120 sends the call request, along with the specified parameters, to the selected EP 130.

In the illustrated embodiment, EP 130 includes a call host 230, a task server 240, a symbolic server 242, and an acoustic server 244. Generally, call host 230 is an otherwise conventional call host, configured to support lines of service for human-interactive media. Generally, call host 230 is configured to control operation of task server 240, symbolic server 242, and acoustic server 244. Generally, task server 240, symbolic server 242, and acoustic server 244 are otherwise conventional human-interactive media servers and are collectively configured to provide application service resources.

In response to a call request, EP 130 determines whether to accept the call request. In one embodiment, EP 130 determines whether to accept the call request based on its own acceptance criteria. In one embodiment, the acceptance criteria include the ability of EP 130 to service additional application service requests. In one embodiment, the acceptance criteria include the ability of EP 130 to create an appropriate application to service the call request, the ability of EP 130 to accommodate necessary request parameters, and other suitable criteria.

As indicated at (5), EP 130 sends a response to CP 120, based on the determination of whether to accept the call request. In one embodiment, allowed responses are grouped into classes designated as 100, 200, 300, 400, 500, and 600. In one embodiment, a 200-class response indicates that EP 130 accepts the call request. In one embodiment, a 400-, 500-, or 600-class response is an error response (e.g., busy, configuration error, etc.), and indicates that EP 130 rejects the call request for the reason indicated by the class. In one embodiment, a 100-class response is a provisional response, indicating that EP 130 is preparing to accept the call request, but is not presently ready.

As indicated at (6), CP 120 updates EST 220 based on the response from the EP. In one embodiment, CP 120 updates EST 220 using only information carried in the response code itself. In an alternate embodiment, CP 120 updates EST 220 using additional information in the response, including the headers and other suitable information.

In the event the selected EP 130 rejects the call request, or if CP 120 does not receive a response within the time-out period, CP 120 updates the EST 220 to indicate that information. Additionally, in one embodiment, CP 120 selects another candidate EP 130 to service the call request. In one embodiment, CP 120 rejects the call quests after a pre-determined number of failed attempts to assign an EP 130.

In one embodiment, if the response is a 100-class provisional response, CP 120 is configured to wait while the selected EP 130 configures itself to accept the request. In one embodiment, CP 120 extends the response time-out period in response to a 100-class response. In an alternate embodiment, CP 120 waits a pre-determined period of time before selecting an alternate EP 130. In one embodiment, the time-out for responses other than 100-class responses is 2 seconds. In one embodiment, the time-out period is configured to allow CP 120 to bypass non-responding EPs 130, thereby speeding up the Endpoint selection process.

In one embodiment, if the response is a 200-class acceptance response, or otherwise indicates that the selected EP 130 accepts the call request, CP 120 establishes the communications link on behalf of the selected EP 130. As indicated at (7), EP 130 communicates along a communications link with interface 110. As indicated at (8), interface 110 communicates along a communications link with call provider 114. Specifically, EP 130 provides the requested services to call provider 114 via interface 110.

As indicated at (7), EP 130 communicates with call provider 114 through interface 110, and not through CP 120. That is, in one embodiment, CP 120 is only responsible for establishing the communications link, and drops out of the communication messaging path once the call request is accepted and the communications link is established. In one embodiment, CP 120 establishes a direct end-to-end connection between call provider 114 and the selected EP 130. As such, in one embodiment, CP 120 is not required to maintain a call state or proxy media streams to support the communications link.

Generally, EP 130 remains in communication with call provider 114 along the established communications link for as long as desired by the parties engaged in the communications. In one embodiment, when the communication ends, EP 130 closes the communications link. In one embodiment, EP 130 maintains its configuration after the communications end.

For example, in one embodiment, when EP 130 accepts a call request, EP 130 is configured to retain the configuration for a pre-determined period of time after the call ends and the communications link closes. In one embodiment, EP 130 is configured to retain the configuration for a pre-determined period of time after the communications link is established, in support of a "full attention" mode.

Thus, protocol 200 provides a system configured to establish communications links based on EP state information held by CP 120 in an EST 220. As described above, systems embodying protocol 200 can be configured to respond quickly and efficiently to call requests, by identifying candidate EPs 130 through information maintained in EST 220. Where a particular EP 130 cannot service a call request, CP 120 selects alternative EPs 130.

Figure 3:
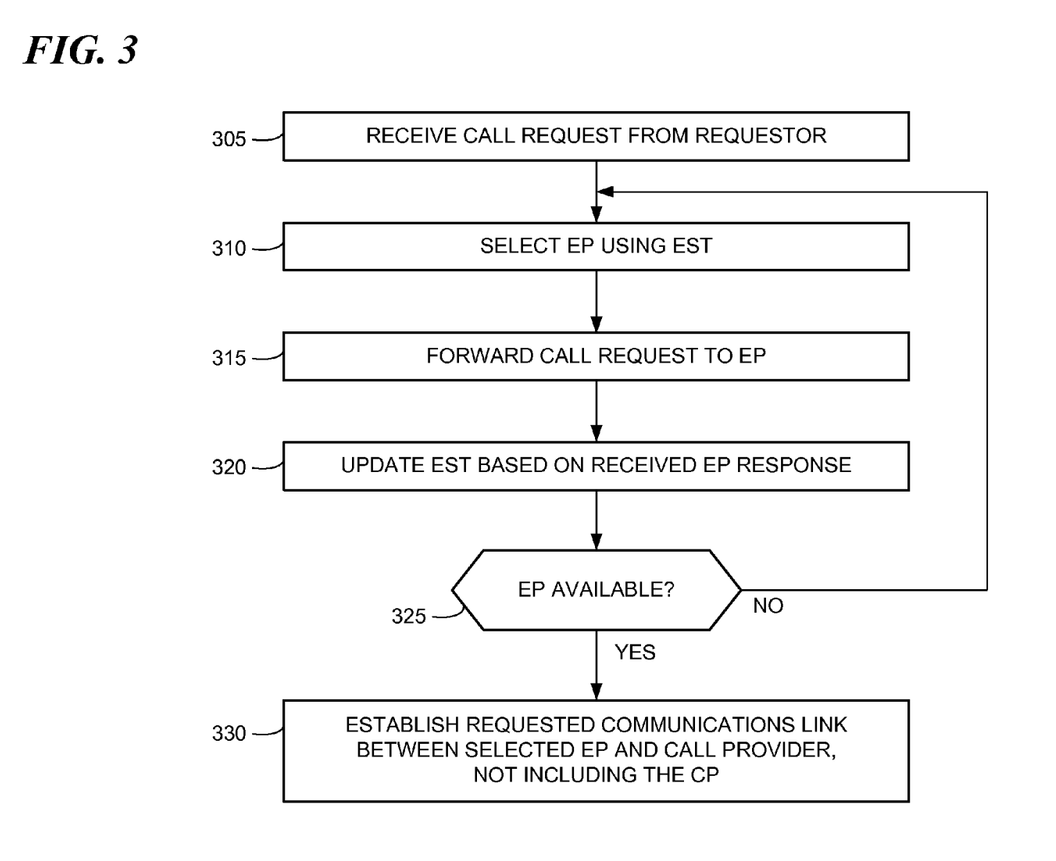
FIG. 3 is a high-level flow diagram depicting logical operational steps of a method for establishing a communications link for communicating human-interactive media.

FIG. 3 is a flow diagram depicting logical operational steps of a method for establishing a communications link for communicating human-interactive media. As indicated at block 305, the process begins and CP 120 receives a call request from a requestor. As described above, in one embodiment, the call request initiates at a call provider 114. In an alternate embodiment, the call request initiates at JIS 140.

Next, as indicated at block 310, CP 120 selects a candidate EP 130 using EST 220. Next, as indicated at block 315, CP 120 forwards the call request to the selected EP 130. As described above, in one embodiment, CP 120 includes additional parameters.

Next, as indicated at block 320, CP 120 updates EST 220 based on the response from the selected EP 130. As described above, in one embodiment, CP 120 is configured to time-out after a pre-determined period of time, during which CP 120 does not receive a response from the selected EP 130. In one embodiment, CP 120 is configured to recognize a time-out as a rejection.

Next, as indicated at decisional block 325, CP 120 determines whether the selected EP 130 is available to service the call request. As described above, CP 120 determines whether the selected EP 130 is available to service the call request based on the response (or time-out) received from the selected EP 130. If the selected EP 130 is not available to service the call request, the process continues along the NO branch, returning to block 310, wherein CP 120 selects an alternate EP 130.

If at block 325 the selected EP 130 is available to service the call request, the process continues along the YES branch to block 330. As indicated at block 330, CP 120 establishes the requested communications link between the selected EP 130 and call provider 114, and the process ends. As described above, the established communications link does not include CP 120.

Thus, as described above, the embodiments disclosed herein exploit traffic behavior in systems with many Endpoint resources. As described above, the CPs 120 maintain state information on the Endpoint resources. In large systems, with many EPs 130, multiple service requests are present in the system simultaneously at different stages in the request process, causing EP 130 states to change very rapidly. But because the CPs 120 update the state information according to the responses received from the EPs 130, at any given moment the state information reflects the most recent known state of each Endpoint resource, from the perspective of that CP 120. As such, the up-to-date state information stored in EST 220 increases the speed at which CP 120 identifies the best-suited EP 130 to be selected for future call requests, yielding an substantially faster connection time.

So configured, system 102 improves maintenance and reparability for highly intensive human-interactive systems. Additionally, because each EP 130 decides independently whether it is in service or available, an EP 130 can be taken out of service for maintenance or repair without disturbing other EPs 130 or other system components. Additionally, as many EPs 130 are available at any one time, idle EPs 130 ones can be reconfigured to any particular human interaction application or application service resource at any time. Furthermore, in one embodiment, system 102 is configured for high scalability for highly intensive human interactive systems. That is, additional EPs 130 can be brought online without requiring system shut down or interruption of service. Additionally, in one embodiment, system 102 is configured for high redundancy, with multiple EPs 130. In one embodiment, system 102 is configured to avoid a single point of failure, with two or more components of each type always available.

Other modifications and implementations will occur to those skilled in the art without departing from the spirit and scope of the invention as claimed. Accordingly, the above description is not intended to limit the invention except as indicated in the following claims.

What is claimed is:

1. A method for facilitating rapid establishment of a voice communications link over an Internet Protocol (IP) based network between a target call provider coupled to the IP network and one of a plurality of call-host endpoints, each of the plurality of endpoints configured to provide human-interactive media application services and being coupled to the IP network through at least one network interface, the method comprising:
    transmitting a call request to a connection proxy, the call request specifying the target call provider and specifying link characteristics including those application services being requested; and
    facilitating the establishment of a voice communications link between the target call provider and a selected one of the plurality of endpoints in response to the call request, said facilitating further comprising:
        selecting one of the endpoints based on an appropriate match between the specified link characteristics of the call request and state information being maintained for each of endpoints, the state information connoting a last known operational status of each of the endpoints, the last known operational status indicating a capability of each of the endpoints to accept the call request;
        forwarding the call request from the connection proxy to the selected endpoint;
        returning a response to the connection proxy from the selected endpoint, the returned response indicating a current capability of the selected endpoint to accept the call request based on its current operational status;
        updating the state information for the selected endpoint based on the current operational status indicated by the returned response; and
        establishing the voice communications link between the target call provider and the selected endpoint when the returned response indicates that the selected endpoint accepts the call request.

2. The method of claim 1, further comprising:
    when the returned response is a rejection response:
        repeating said selecting one of the endpoints from the plurality of endpoints not already selected, and repeating said forwarding the call request and said returning a response for the selected endpoint until the returned response indicates an acceptance of the call request.

3. The method of claim 2, wherein the connection proxy rejects the call request after said repeating of said selecting one of the plurality of endpoints reaches a predetermined number of times without receiving a returned response indicating an acceptance of the call request.

4. The method of claim 3, wherein:
    the rejected call request is sent to a second connection proxy coupled to a second plurality of endpoints; and
    the second connection proxy performs said facilitating in response to the rejected call request on behalf of the second plurality of endpoints.

5. The method of claim 1, further comprising:
    when a response is not returned by the selected endpoint within a predetermined time:
    updating the state information for the selected endpoint to reflect a failure to return a response within the predetermined time; and
    repeating said selecting one of the endpoints for all endpoints not already selected, and repeating said forwarding the call request and said returning a response for the selected endpoint until the returned response indicates an acceptance of the call request.

6. The method of claim 1, wherein:
    the connection proxy performs said facilitating; and
    the connection proxy does not participate in any communication over the established communication link between the target call provider and the selected endpoint.

7. The method of claim 1, wherein the call request is an in-bound session initiation protocol (SIP) call request generated by the target call provider.

8. The method of claim 1, wherein the call request is an out-bound session initiation protocol (SIP) call request generated by a job initiation service (JIS).

9. The method of claim 1, wherein the selected one of the endpoints determines whether to accept the call request based on its own criteria in view of its current operational status and the link characteristics specified by the call request.

10. The method of claim 1, wherein the response returned to the connection proxy by the selected endpoint can be one of a plurality of classes, each of the classes conveying state information indicating a different operational status and capability of servicing the call request.

11. The method of claim 10, wherein one of the plurality of classes indicates that the selected endpoint accepts the call request and is capable of providing the specified application services immediately.

12. The method of claim 10, wherein:
one of the plurality of classes accepting the call request indicates that the selected endpoint is capable of providing the requested application services after a configuration delay; and
if the selected endpoint returns a second response indicating it is ready to accept the call request within a predetermined acceptable delay time, the connection proxy performs said establishing on behalf of the selected endpoint.

13. The method of claim 10 wherein the class is embedded within the returned response as a class code, and the state information for the selected endpoint is updated based on at least the embedded class code.

14. The method of claim 1 wherein the appropriate match is a best match based on which of the plurality of endpoints is most likely being capable of accepting the call request and providing the requested application services in view of its state information.

15. A system for facilitating rapid establishment of a voice communications link over an Internet Protocol (IP) based network, the communications link supporting human-interactive media applications, the system comprising:
a plurality of call-host endpoints, each of the plurality of endpoints configured to provide human-interactive media application services;
at least one network interface coupled between the IP network and the plurality of endpoints;
an endpoint state table, the endpoint state table maintaining state information for each of the plurality of endpoints, the state information connoting a last known operational status of each of the endpoints, the last known operational status indicating a capability of each of the endpoints to accept the call request; and
a connection proxy coupled between the at least one network interface and the plurality of endpoints, the connection proxy further in communication with the endpoint state table, the connection proxy for establishing a communications link between a target call provider and one of the plurality of endpoints;
whereby the connection proxy is configured to:
receive a call request through the at least one network interface, the call request specifying a target call provider and specifying link characteristics of a desired voice communications link, the link characteristics including those application services being requested,
select one of the endpoints based on an appropriate match between the specified link characteristics of the call request and the state information,
forward the call request from the connection proxy to the selected endpoint,
receive a response from the selected endpoint, the received response indicating a current capability of the selected endpoint to accept the call request based on its current operational status,
update the state information for the selected endpoint based on the current operational status indicated by the returned response, and
establish the voice communications link between the target call provider and the selected endpoint when the returned response indicates that the selected endpoint accepts the call request.

16. The system of claim 15, wherein the connection proxy is further configured to:
when the received response is a rejection response:
repeat selecting one of the endpoints from the plurality of endpoints not already selected, and repeat forwarding the call request and receiving a response from the selected endpoint until the returned response indicates an acceptance of the call request.

17. The system of claim 16, wherein the connection proxy is further configured to reject the call request after attempting to select one of the plurality of endpoints more than a predetermined number of times without receiving a returned response indicating an acceptance of the call request.

18. The system of claim 17, wherein:
the rejected call request is sent to a second connection proxy coupled between the at least one network interface and a second plurality of endpoints; and
the second connection proxy is configured to facilitate establishing a communications link in response to the rejected call request on behalf of the second plurality of endpoints.

19. The system of claim 15, wherein the connection proxy is further configured to:
when a response is not returned by the selected endpoint within a predetermined time:
update the state information for the selected endpoint to reflect a failure to receive a response within the predetermined time; and
repeat selecting one of the endpoints from all endpoints not already selected, and repeating forwarding the call request and receiving a response for the selected endpoint until the returned response indicates an acceptance of the call request.

20. The system of claim 15, wherein the connection proxy does not participate in any communication over the established communications link between the target call provider and the selected endpoint.

21. The system of claim 15, wherein the call request is an in-bound session initiation protocol (SIP) call request generated by the target call provider.

22. The system of claim 15, wherein the call request is an out-bound session initiation protocol (SIP) call request generated by a job initiation service (JIS).

23. The system of claim 15, wherein the selected one of the endpoints determines whether to accept the call request based on its own criteria in view of its current operational status and the link characteristics specified by the call request.

24. The system of claim 15, wherein the response received by the connection proxy from the selected endpoint can be one of a plurality of classes, each of the classes conveying state information indicating a different operational status and capability of servicing the call request.

25. The system of claim 24, wherein one of the plurality of classes indicates that the selected endpoint accepts the call request and is capable of providing the specified application services immediately.

26. The system of claim 24, wherein:
one of the plurality of classes accepting the call request indicates that the selected endpoint is capable of providing the requested application services after a configuration delay; and
if the selected endpoint returns a second response indicating it is ready to accept the call request within a predetermined acceptable delay time, the connection proxy establishes the communications link on behalf of the selected endpoint.

27. The system of claim 24 wherein the class is embedded within the received response as a class code, and the state information for the selected endpoint is updated based on at least the embedded class code.

28. The system of claim 15 wherein the appropriate match is a best match based on which of the plurality of endpoints is most likely being capable of accepting the call request and providing the requested application services in view of its state information.

29. The system of claim 15, wherein each of the endpoints is further configured to retain a current application configuration for a period of time after termination of an established communications link.

30. The system of claim 15, wherein the state information includes a last known application configuration for each of the endpoints.

31. The system of claim 15, wherein each of the plurality of endpoints is further configured to send current state information to the connection proxy at a predetermined interval, the connection proxy configured to update the endpoint state table with the current state information.

32. The system of claim 15, further comprising a plurality of connection proxies, each coupled to the IP network through at least one network interface, each of the plurality of connection proxies coupled to a unique subset of the plurality of endpoints, each of the plurality of connection proxies configured to establish a communications link between targeted call providers and one of its unique subset of endpoints.

33. The system of claim 15, wherein each of the plurality of connection proxies maintains status information for its own unique subset of endpoints.

* * * * *